United States Patent Office 3,655,661
Patented Apr. 11, 1972

3,655,661
BENZOTHIADIAZOLE COMPOUNDS
Burton K. Wasson, Valois, Quebec, Canada, assignor to Charles E. Frosst and Co.
No Drawing. Filed May 22, 1968, Ser. No. 731,334
Int. Cl. C07d 91/68
U.S. Cl. 260—247.1        5 Claims

ABSTRACT OF THE DISCLOSURE

5-[3-(substituted amino) - 2 - hydroxypropoxy]-2,1,3-benzothiadiazole compounds which exhibit β-adrenergic blocking properties and thus are useful in the management of angina pectoris are described. The products are prepared by one of two principal methods (1) reaction of a 5-hydroxy-2,1,3-benzothiadiazole with epihalohydrin to provide 5-(3-halo-2-hydroxypropoxy)-2,1,3-benzothiadiazole which, upon treatment with alkali, forms the epoxide which is then reacted with an amine to provide the desired product; and (2) reductive alkylation of an

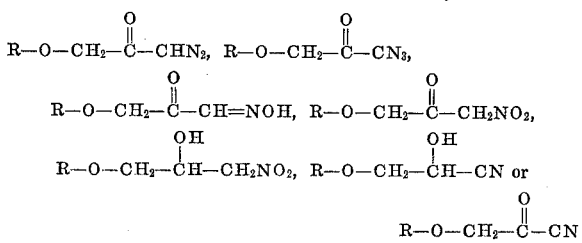

wherein R is the 2,1,3-benzothiadiazol-5-yl group.

---

This invention is concerned with 5-[3-(substituted-amino)-2-hydroxypropoxy]-2,1,3 - benzothiadiazole compounds which have been found to exhibit β-adrenergic blocking properties and have the marked advantage of having a long duration of action and being effective at relatively low dosages.

Of particular interest are the 2,1,3-benzothiadiazole compounds having attached to the 5-position carbon a 3-(substituted amino)-2-hydroxypropoxy group wherein the hydroxy group optionally can be present in the form of an ester group and where the hydrogens attached to the propyl chain optionally can be replaced by lower alkyl substituents. Preferably, however, the 5-position substituent is the 3-substituted amino-2-hydroxypropoxy group. These compounds exhibit especially desirable β-adrenergic blocking properties and, unlike previously known adrenergic blockers, the activity is exhibited over a prolonged period of time and is surprisingly devoid of β-adrenergic stimulating properties.

The novel β-adrenergic blocking agents of this invention can be illustrated by the structure

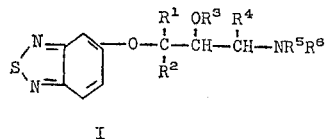

I and pharmacologically acceptable salts thereof, wherein $R^1$ is selected from hydrogen and lower alkyl having from 1 to 3 carbons; $R^2$ is selected from hydrogen and lower alkyl having from 1 to 3 carbons; $R^3$ is selected from hydrogen and benzoyl or lower alkanoyl wherein the alkanoyl group contains from 2 to 4 carbons; $R^4$ is selected from hydrogen and lower alkyl having from 1 to 3 carbons; $R^5$ represents hydrogen, lower alkyl having a straight or branched chain containing from 1 to 5 carbons, phenyl-lower alkyl wherein the alkyl moiety has from 1 to 3 carbons, and lower alkanoyl having from 2 to 5 carbons; $R^6$ represents (1) a straight or branched chain alkyl having from 1 up to about 20 carbons but preferably a branched chain alkyl having from 3 to 6 carbons such as isopropyl, tert-butyl, 2,2-dimethylpropyl and the like, (2) an unsaturated straight or branched chain alkyl as the alkenyl or alkinyl groups having preferably from 2 to 6 carbons, such as allyl, butynyl, propargyl and the like, said straight or branched chained, saturated or unsaturated alkyl optionally being substituted with one or more groups preferably selected from (a) hydroxy, (b) halogen especially chloro and bromo, (c) carboxyl or lower alkyl ($C_{1-3}$) ester thereof, (d) lower alkoxy or alkylthio where the alkyl moiety is straight or branched chain and contains from 1 to 4 carbons, (e) di-loweralkyl ($C_{1-3}$) amino wherein the alkyl groups optionally can be joined together either directly or through a hetero atom, particularly an oxygen, nitrogen or sulfur atom to form a heterocyclic group selected especially from pyrrolidinyl, piperazinyl, piperidinyl, morpholino, thiazolidinyl or thiazinyl group, each —N< group preferably being attached to an alkyl moiety having 1 to 8 carbons, (f) phenyl or phenoxy optionally substituted with from one to three similar or dissimilar groups selected from alkoxy ($C_{1-3}$), halogen (preferably chloro) or hydroxy, (g) a 5 to 6 membered heterocycle attached through a nuclear carbon and having oxygen, nitrogen or sulfur as the hetero atom such as a tetrahydrofuryl, furyl, thienyl, pyrrolidyl, piperidinyl and the like, (3) $R^6$ also can represent phenyl optionally substituted with lower alkyl ($C_{1-3}$) or a 5 to 6 membered nitrogen-containing heterocycle as pyrrolidyl, piperidinyl and the like, (4) a cycloalkyl group having from 3 to 6 nuclear carbons, optionally lower alkyl ($C_{1-3}$) substituted such as the cyclopropyl, cyclopentyl, cyclohexyl, 2-methylcyclohexyl and the like, or having a heterocyclic substituent such as a 5 or 6 membered heterocycle containing nitrogen and oxygen as the hetero atom(s), (5) a 5 to 6 membered heterocycle having oxygen, nitrogen or sulfur as a hetero atom and being attached through a nuclear carbon, optionally lower alkyl ($C_{1-3}$) substituted or having a 5 or 6 membered heterocyclic substituent containing nitrogen and oxygen as the hetero atom(s) such as pyrrolidyl, 2-methylpyrrolidyl, morpholino, piperidino, pyridyl, morpholino-pyridyl, piperizinyl-pyridyl, and the like; and when $R^5$ and $R^6$ separately represent lower alkyl or lower alkenyl they additionally can be joined together either directly or through one or two hetero atoms selected from oxygen, nitrogen and sulfur to form a 4 to 6 membered ring with the nitrogen to which they are attached which heterocycles can optionally be substituted with a lower alkyl ($C_{1-3}$) to form, for example, the pyrrolidyl, piperidino, morpholino, hexahydroazepinyl, pyrimidyl, p-thiazinyl, $\Delta^3$- or $\Delta^2$-piperidinyl, 1,2-dihydropyridyl and the like.

Suitable pharmacologically acceptable salts of product I are acid addition salts prepared by treatment with either inorganic or organic acids, for example derived from inorganic acids, such as hydrochlorides, hydrobromides, phosphates or sulfates or salts derived from organic acids, such as oxalates, lactates, malates, maleates, formates, acetates, succinates, tartrates, salicylates, citrates, phenylacetates, benzoates, p-toluenesulfonates and other salts such as those that provide relatively insoluble products that afford a slow release of the active material, for example, a 1,1'-methylene-bis(2-hydroxy-3-naphthoate) and the like.

The novel 5[3-(substituted amino)-2-hydroxypropoxy]-2,1,3-benzothiadiazole compounds, structure I, which contain one asymmetric carbon atom in the propylene chain will be obtained as racemic compounds which can be separated into optically active isomers by known methods, for example, by forming a salt with an optically active acid, many of which are known to those skilled in the art, such as optically active tartaric, mandelic, cholic, O,O-di-p-toluoyl tartaric, O,O-dibenzoyl tartaric acids or other acids conventionally employed for this purpose. Those products that contain two or mor asymmetric carbons in the propylene chain will be obtained as diastereoisomers, and each diastereoisomer, of course, also will be obtained as a racemic compound which can be separated into its optically active isomers by known methods such as described above. Resolution of certain representative products will be described in the detailed examples. All products can be similarly resolved and the claims will be understood to embrace the products in the form of racemic compounds or diastereoisomers as well as in the form of the optically active isomers where appropriate.

While all of the compounds embraced by the above definition possess β-adrenergic blocking properties of the type discussed above, the products having the structure given above wherein $R^1$, $R^2$, $R^3$, $R^4$ and $R^5$ are hydrogen have been found to exhibit β-adrenergic blocking properties to a marked degree and within this subgroup of products those compounds wherein $R^6$ is a branched chain alkyl having 3 to 6 carbons preferably saturated and either unsubstituted or having a hydroxy or alkoxy substituent attached to the alkyl moiety as well as the branched chain alkinyl groups have been found to exhibit especially marked β-adrenergic blocking properties.

The preferred group of products therefore can be illustrated by the structure

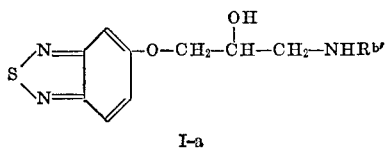

I-a wherein $R^{6'}$ has the more limited meaning given in the preceding paragraph.

The potential of a product as a β-adrenergic blocking agent conventionally is evaluated by the protocol which was employed to assess the β-blocking properties of the 2,1,3-benzothiadiazole compounds of this invention. The protocol employed comprises intravenous administration of graded doses of the selected compounds to rats which then are challenged with a standard dose of isoproterenol, a product known to be a β-stimulant. An $ED_{50}$ in the order of about 5 mg./kg. is representative for the products of this invention when tested according to this protocol.

The clinical application of β-adrenergic blocking agents are well-known to physicians, a review of certain clinical applications being contained in The American Journal of Cardiology, 18: 3, 303–496 (1966) as well as in the New England Journal of Medicine, 275: 1106–1112 and 1175–1183 (1966), Epstein et al. and Annals of Internal Medicine, 67: 1333–1337 (December, 1967), Epstein et al. One use for the novel products of this invention which constitutes the best mode for use of the products known to applicant at this time is for the control of tachycardia that may be drug induced (as by isoproterenol) or brought about by physiological conditions. In view of the considerable amount of literature that has accumulated concerning the use of β-adrenergic blocking agents, physicians would employ the products of this invention in any of the known conditions where agents possessing this property are needed, such as in the management of angina pectoris, at a dosage level titrated to the needs of each patient.

The products can be prepared in pharmaceutical formulations suitable for oral, rectal or parenteral administration preferably in the form of tablets, solutions, suspensions and emulsions. The 2,1,3-benzothiadiazoles can be formulated in the form of the free base or in the form of their salts in conjunction or admixture with organic and/or inorganic solid or liquid pharmaceutical excipients. No special problems are involved in preparing suitable formulations of these products and methods generally employed for this purpose, which are known to those skilled in this art, are entirely suitable. If desired the compounds can be administered along with or formulated together with other active ingredients. Dosage units of from about 1 mg. to about 20 mg. can be provided for the symptomatic adjustment of dosage by the physician depending upon the age and condition of the patient.

The novel 2,1,3-benzothiadiazole products, I, of this invention are conveniently prepared from the known 5-hydroxy - 2,1,3-benzothiadiazole by the route illustrated below:

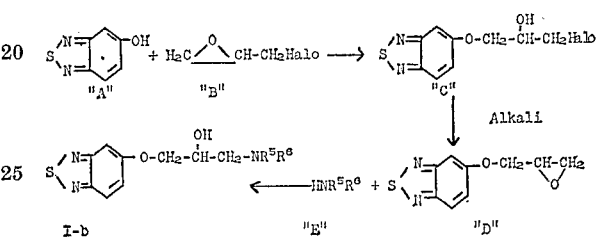

5-hydroxy-2,1,3-benzothiadiazole, product A, is treated with epichlorhydrin or epibromhydrin (B) to provide product C. Ideally, the epihalohydrin is used in excess for its solvent properties and the reaction proceeds at room temperature or with brief warming up to about 90° C. with optimum results being obtained by warming at a temperature between about 55–70° C. The reaction of products A and B additionally is facilitated by the presence of a trace of base which serves as a catalylst, preferred catalysts being piperidine, piperidine hydrochloride, pyridine or other heterocyclic base. The reaction product C can be separated either by extraction with ether or by evaporating the reaction medium. Product C then is shaken with aqueous alkali to afford the epoxide D. Aqueous sodium or potassium hydroxide are preferred at a concentration of about 20% for best results to create a pH of from about 13 to 14. Treatment of the thus obtained product D with an amine, E, provides the desired 5-[3-(substituted amino)-2-hydroxypropoxy]-2,1,3-benzothiadiazole, compound I-b. Advantageously an excess of the amine is employed for its solvent properties; from 3 to 5 moles of the amine being adequate to give very good yields of the desired product. Larger quantities of amine can, of course, be employed if desired. This step can be carried out at a temperature between about ambient temperature and 90° C. although it is preferred to use temperatures between about 60–70° C. It has also been found that certain amines, particularly branched chain monoalkylamines, as neopentylamines, can be refluxed with product C to give the desired product I-a directly.

When any one or more of the variables $R^1$, $R^2$ and $R^4$ is lower alkyl, product I can be prepared by the reaction of starting substance A with an α-haloalkanoic acid of the structure

to provide 5-(α - carboxyalkoxy)-2,1,3-benzothiadiazole which is converted by conventional methods to the acid chloride. Reaction of the acid chloride with a diazoalkane of the structure $R^4CHN_2$ gives the 5-(3-chloro-3-$R^4$-2-oxo-1-$R^1$-1-$R^2$-propoxy)-2,1,3-benzothiadiazole which upon reduction, preferably with sodium borohydride, affords the intermediate C, which is converted to the desired benzothiazole, I-c, by the procedures described above. This alternative method can, of course, be employed also for preparing products wherein $R^1$, $R^2$ and $R^4$ are hydrogen.

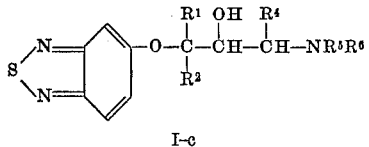

I-c

When $R^3$ of product I is benzoyl or lower alkanoyl, compound I-b or I-c is reacted with the selected acid anhydride or acid chloride at ambient temperature or with slight warming up to about 100° C. whereupon a good yield of the desired product I is formed.

When the final products are obtained in the form of their hydrochloride salt or other salt, they can be converted to the free bases by known methods, for example by neutralization with aqueous sodium carbonate. The bases then can be converted into pharmaceutically acceptable salts by treatment with the desired inorganic or organic acid by known methods.

Another route for preparing the novel products of this invention comprises forming the substituted amino group in situ by reductive alkylation illustrated by the following scheme

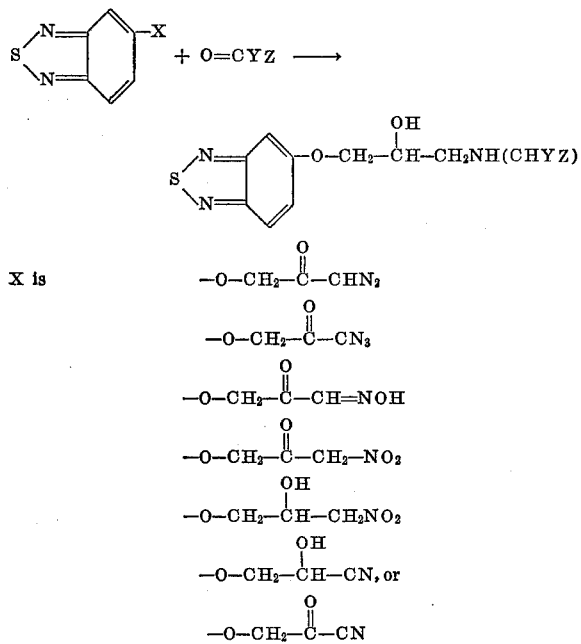

Y is preferably a saturated or unsaturated lower alkyl ($C_{1-5}$), hydroxy-lower alkyl ($C_{2-5}$), lower cycloalkyl ($C_{3-6}$) or phenyl;

Z is lower alkyl ($C_{1-5}$), and when Y and Z are each lower alkyl they can be linked together to form a 3- to 6-membered carbocyclic ring with the carbon to which they are attached.

As catalyst, palladium on charcoal or lithium aluminum hydride as reducing agent, advantageously are employed.

The following examples will illustrate the preparation of representative products of this invention prepared by the above-described procedures. While these procedures are the best mode known to applicant for the preparation of these compounds, it will be appreciated that other alternative methods can be employed as well. The following examples, therefore, are not to be considered as limiting the preparation of any particular compound to the method described as the examples are provided solely to illustrate the best modes currently known to applicant for the preparation of the novel compounds of this invention.

EXAMPLE 1

5-[3-(1,1-dimethyl-2-hydroxyethylamino)-2-hydroxypropoxy]-2,1,3-benzothiadiazole hydrochloride

STEP A: PREPARATION OF 5-(2,3-EPOXYPROPOXY)-2,1,3-BENZOTHIADIAZOLE

A mixture of 2.0 g. (13 millimoles) of 5-hydroxy-2,1,3-benzothiadiazole, 4.3 g. (46 millimoles) of epichlorhydrin, and 0.04 ml. of piperidine is heated and stirred at 80–90° C. until all the solids dissolve. The solution is heated an additional two hours at 80–90° C. and then evaporated to dryness at 0.03 mm. pressure to give a brown viscous oil representing 5-(3-halo-2-hydroxypropoxy)-2,1,3-benzothiadiazole. The oil is stirred for one hour at room temperature with excess 20% aqueous potassium hydroxide, the solids removed, and the filtrate extracted with diethyl ether. The solids and the residue from the ether extract are combined and crystallized from ethanol to give 0.8 g. of 5-(2,3-epoxypropoxy)-2,1,3-benzothiadiazole, M.P. 99.5–100.5° C.

STEP B: PREPARATION OF 5-[3-(1,1-DIMETHYL-2-HYDROXYETHYLAMINO) - 2 - HYDROXYPROPOXY]-2,1,3-BENZOTHIADIAZOLE

A mixture of 200 mg. (0.96 millimole) of 5-(2,3-epoxypropoxy)-2,1,3-benzothiadiazole, 520 mg. (5.8 millimoles) of 2-amino-2-methylpropanol, and 15 ml. of methanol is refluxed for 6 hours. The methanol is removed by aspirator pump and excess 2-amino-2-methylpropanol at a pressure of 0.05 mm. to give a residual yellow glass. The glass is dissolved in a mixture of ethanol-diethyl ether and subjected to a stream of hydrogen chloride. Further treatment of the oily product with a mixture of ethanol-diethyl ether gives 280 mg. (87%) of 5-[3-(1,1-dimethyl-2-hydroxyethylamino)-2-hydroxypropoxy] - 2,1,3 - benzothiadiazole hydrochloride, M.P. 191–192° C. The product is recrystallized from a mixture of ethanol-diethyl ether to give product melting at 190.5–191.5° C.

*Analysis.*—Calculated for $C_{13}H_{20}ClN_3O_3S$ (percent): C, 46.77; H, 6.04; Cl, 10.62; N, 12.59; S, 9.60. Found (percent): C, 46.75; H, 6.36; Cl, 10.82; N, 11.90; S, 9.87.

EXAMPLE 2

5-(3-N-morpholino-2-hydroxypropoxy)-2,1,3-benzothiadiazole hydrochloride

A mixture of 1.76 g. (20 millimoles) of morpholine, 0.7 g. (3.4 millimoles) of 5-(2,3-epoxypropoxy)-2,1,3-benzothiadiazole (prepared as described in Example 1, Step A) and 30 ml. of methanol is refluxed and stirred for 24 hours. Excess morpholine and methanol are removed in vacuo giving a brown solid. The solids, dissolved in a mixture of ethanoldiethyl ether, is treated with hydrogen chloride to give a precipitate that is crystallized from glacial acetic acid containing a trace of concentrated hydrochloric acid yielding 0.7 g. (59%) of 5-(3-N-morpholino-2-hydroxypropoxy)-2,1,3-benzothiadiazole hydrochloride, M.P. 235.5–237.5° C.

*Analysis.*—Calculated for $C_{13}H_{18}ClN_3O_3S$ (percent): C, 47.06; H, 5.47; Cl, 10.71; N, 12.66; S, 9.66. Found (percent): C, 46.82; H, 5.36; Cl, 11.00; N, 12.67; S, 9.90.

EXAMPLE 3

5-[3-(1,1-dimethyl-2-hydroxyethylamino)-2-hydroxybutoxy]2,1,3-benzothiadiazole

STEP A: PREPARATION OF 5-(3-CHLORO-2-HYDROXYBUTOXY)-2,1,3-BENZOTHIADIAZOLE 5- hydroxy-2,1,3-benzothiadiazole is treated with 2-chloroacetic acid in the presence of ethanolic sodium hydroxide to give 5-carboxymethoxy-2,1,3-benzothiadiazole. Treatment of this acid with thionyl chloride or oxalyl chloride affords the acid chloride 5-(chlorocarbonylmethoxy)-2,1,3-benzothiadiazole. The acid chloride (1 part) in 20 parts of diethyl ether is treated dropwise at —10° to —15° C. with a slight excess of diazoethane in 30 parts of diethyl ether and the mixture stirred 1 hour longer at —10° C.

The solution is left at room temperature overnight, cooled to −10° to −15° C. and treated with anhydrous hydrogen chloride until evolution of nitrogen is complete. The solution is successively washed with water, a 5% sodium carbonate solution, and water. The dried solution is evaporated to a residue to give 5-(3-chloro-2-oxobutoxy)-2,1,3-benzothiadiazole. This crude product (1 part) in 5 parts of isopropanol is treated at 0–5° C. with a solution containing an excess of sodium borohydride in 5 parts of isopropanol. The mixture is left for 3–5 hours at room temperature, then poured onto a mixture of ice and acetic acid, extracted with ether, and worked up to give 5-(3-chloro-2-hydroxybutoxy)-2,1,3-benzothiadiazole.

STEP B: PREPARATION OF 5-[3-(1,1-DIMETHYL-2-HYDROXYETHYLAMINO) - 2 - HYDROXYBUTOXY] - 2,1,3- BENZOTHIADIAZOLE HYDROCHLORIDE

A mixture of 1 part of 5-(3-chloro-2-hydroxybutoxy)-2,1,3-benzothiadiazole and 7.5 parts of 2-amino-2-methyl-propanol is heated for about 10 hours at 100° C. in a sealed vessel. The product is isolated by the method described in Example 1, Step. B, to give 5-[3-(1,1-dimethyl-2-hydroxyethylamino)-2 - hydroxybutoxy] - 2,1,3 - benzothiadiazole. The base is dissolved in anhydrous diethyl ether and treated with anhydrous hydrogen chloride to give 5-[3-(1,1-dimethyl-2-hydroxyethylamino)-2-hydroxybutoxy]-2,1,3-benzothiadiazole hydrochloride.

EXAMPLE 4

5-(3-N-morpholino-2-hydroxy-1-methylpropoxy)-2,1,3-benzothiadiazole hydrochloride STEP A: PREPARATION OF 5-(3-CHLORO-2-HYDROXY-1-METHYLPROPOXY)-2,1,3-BENZOTHIADIAZOLE By following substantially the same procedure described in Example 3, Step A, but employing 2-bromopropionic acid in place of the 2-chloroacetic acid there is obtained 5 - (3 - chloro - 2 - hydroxy - methylproproxy)-1,3-benzothiadiazole.

STEP B: PREPARATION OF 5 - (3-N-MORPHOLINO-2-HYDROXY - 1 - METHYLPROPOXY) - 2,1,3-BENZOTHIADIAZOLE HYDROCHLORIDE

The procedure described in Example 3, Step B, is repeated with the exception that 5-(3-chloro-2-hydroxybutoxy)-2,1,3-benzothiadiazole is replaced by 5-(3-chloro-2-hydroxy-1-methylpropoxy)-2,1,3-benzothiadiazole. Thus 5 - (3 - N - morpholino) - 2 - hydroxy - 1 - methylpropoxy-2,1,3-benzothiadiazole is obtained and isolated as the hydrochloride salt.

EXAMPLE 5

5-(3-N-morpholino-2-acetoxypropoxy)-2,1,3-benzothiadiazole hydrochloride

A mixture of 5-(3-N-morpholino-2-hydroxypropoxy)-2,1,3-benzothiadiazole (prepared as described in Example 2), 5 parts of acetic acid, and 1 part of acetic anhydride is left for about 24 hours at room temperature. The solution is poured on ice, made alkaline with ammonium hydroxide, extracted with ethyl ether, and the ethereal solution dried over anhydrous magnesium sulfate. The ethereal solution then is treated with anhydrous hydrogen chloride and the precipitated product is recrystallized from ethanol-diethyl ether to give 5-(3-N-morpholino-2-acetoxypropoxy)-2,1,3-benzothiadiazole hydrochloride.

EXAMPLE 6

5-(3-N-morpholino-2-benzoyloxypropoxy)-2,1,3-benzothiadiazole hydrochloride

A mixture of 1 part of 5-(3-N-morpholino-2-hydroxypropoxy)-2,1,3-benzothiadiazole hydrochloride and 2.5 parts of benzoylchloride is heated for about 6 hours at 100° C. The mixture is cooled and added to 25 parts of diethyl ether. The ether is decanted, the remaining solid is slurried with a further 25 parts of diethyl ether, and the mixture is filtered. The collected product is washed several times with further amounts of diethyl ether. The solid is recrystallized from ethanol-diethyl ether to give 5-(3-N-morpholino-2-benzoyloxypropoxy) - 2,1,3 - benzothiadiazole hydrochloride.

EXAMPLE 7

5-(3-N-morpholino-2-hydroxypropoxy)-2,1,3-benzothiadiazole benzoate

A solution of 1 part of 5-(3-N-morpholino-2-hydroxypropoxy)-2,1,3-benzothiadiazole in 50 parts of ethyl acetate is added to a solution of 1 part of benzoic acid in 40 parts of diethyl ether. The resulting solid is collected on a filter plate and washed several times with diethyl ether. The product is recrystallized from a mixture of ethanol-diethyl ether to give 5-(3-N-morpholino-2-hydroxypropoxy)-2,1,3-benzothiadiazole benzoate.

In the following sections describing methods of resolving certain of the racemic products of this invention, no attempt has been made to assign an absolute configuration to the compounds. The (−)- and (+)-isomers of the resolving agents refer to the optical rotation of the parent (−)- or (+) agent employed. All (−)- and (+) values given throughout for the compounds refer to the actual rotation of the free base, i.e., in referring to the levorotatory salt, (+)-5-(3-N-morpholino - 2 - hydroxypropoxy)-2,1,3-benzothiadiazole O,O-di-p-toluoyl-(−)-tartrate, the (+)- sign refers to the sign of rotation of the free base, (+) - 5 - (3 - N - morpholino - 2 - hydroxypropoxy)-2,1,3-benzothiadiazole.

RESOLUTION OF EXAMPLE 2 PRODUCT

Section 1.—Isolation of (+)-5-(3-morpholino-2-hydroxypropoxy)-2,1,3-benzothiadiazole Step A: A warmed solution of 0.1 mole of racemic 5-(3-N-morpholino-2-hydroxypropoxy)-2,1,3-benzothiadiazole, prepared as described in Example 2, in 100 ml. of ethanol is added to a warmed solution of 0.1 mole of O,O-di-p-toluoyl-(−)-tartaric acid in 225 ml. of ethanol and the mixture left overnight at 5° C. The precipitate that forms is collected, washed with 25 ml. of ethanol and dried to give (+)-5-(3-N-morpholino-2-hydroxypropoxy) - 2,1,3-benzothiadiazole hydrogen O,O-di-p-toluoyl-(−)-tartrate.

Step B: The above salt (0.03 mole) is shaken with a mixture of 100 ml. of water, 14 ml. (0.07 mole) of 5 N sodium hydroxide solution and 100 ml. of diethyl ether. Two further ether extractions (2× 50 ml.) are performed and the combined ethereal extract is extracted once with 30 ml. (ca. 0.04 mole) of 1.38 N hydrochloric acid. The acid layer is extracted once with a small amount of diethyl ether and then basified with 10 ml. (0.05 mole) of 5 N sodium hydroxide solution. The liberated base is extracted with 100 ml. of diethyl ether, followed by two 25 ml. portions of ether. The ethereal extracts are combined and washed with 20 ml. (2× 10 ml.) of water, dried over anhydrous magnesium sulfate and evaporated to dryness under reduced pressure to give (+)-5-(3-N-morpholino-2-hydroxypropoxy)-2,1,3-benzothiadiazole.

Section 2.—Isolation of (−)-5-(3-N-morpholino-2-hydroxypropoxy)-2,1,3-benzothiadiazole All liquors and washes resulting from the isolation of (+)-5-(3-N-morpholino - 2 - hydroxypropoxy) - 2,1,3-benzothiadiazole hydrogen O,O-di-p-toluoyl-(−)-tartrate in Section 1 are combined, evaporated to dryness, and the residue treated with 5 N sodium hydroxide solution as described in Section 1. The mixture is extracted three times with diethyl ether. The combined ethereal extract is washed with water, dried, and evaporated to dryness to give (−)-5-(3-N-morpholino-2-hydroxypropoxy) - 2,1,3-benzothiadiazole.

Section 3.—Isolation of (−)-5-(3-N-morpholino-2-hydroxypropoxy)-2,1,3-benzothiadiazole hydrogen maleate Racemic 5-(3-N-morpholino-2-hydroxypropoxy)-2,1,3-benzothiadiazole prepared as described in Example 2 (0.04 mole) and (+)-tartaric acid (0.02 mole) are admixed in 200 ml. of hot acetone containing 20 ml. of water and aged with stirring at room temperature for two days. The precipitated di-[5-(3-N-morpholino-2-hydroxypropoxy)-2,1,3-benzothiadiazole]-(+)-tartrate is collected by filtration, recrystallized from 125 ml. of hot acetone containing 12.5 ml. of water. The solid material formed is recovered by filtration and then shaken in a separatory funnel with 45 ml. of 1 N ammonium hydroxide and 100 ml. of ether for 10 minutes. The aqueous layer is extracted with 2× 100 ml. portions of ether. The combined ethereal extracts are washed with 2× 20 ml. aliquots of water, dried over magnesium sulfate, filtered and concentrated in vacuo to give (−)-5-(3-N-morpholino-2-hydroxypropoxy)-2,1,3-benzothiadiazole. A mixture of this base and 1.8 g. of maleic acid is dissolved in 240 ml. of hot ethyl alcohol and allowed to age at room temperature with stirring for 18 hours. Filtration of the reaction mixture gives (−)-5-(3-N-morpholino-2-hydroxypropoxy)-2,1,3-benzothiadiazole hydrogen maleate.

Additional products of this invention that are prepared by the principal procedure described for the synthesis of the novel products of this invention and more particularly illustrated by Examples 1 and 2 are identified in the following table. The products advantageously are prepared from 5-(2,3-epoxypropoxy)-2,1,3-benzothiadiazole (synthesized by the process described in Step A of Example 1) which then is reacted with the amine, E, identified in the following table by substantially the same procedure described either in Example 1, Step B or Example 2. The substituents $R^5$ and $R^6$ in the amine reactant E remain unchanged in the end product and these substituents are identified in Table I.

TABLE I

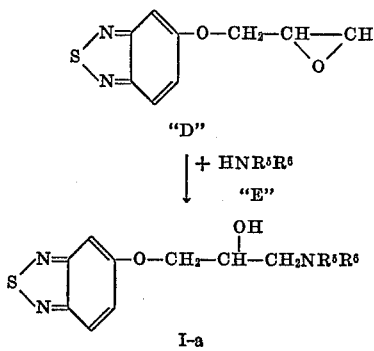

"D"

↓ + HNR⁵R⁶
    "E"

[Structure of I-a: benzothiadiazole—O—CH₂—CH(OH)—CH₂NR⁵R⁶]

I-a

| R⁵ | R⁶ |
|---|---|
| H | —C(CH₃)₃ |
| H | —CH(CH₃)₂ |
| H | —CH₂—C(CH₃)₃ |
| H | —C(CH₃)₂—C≡CH |
| H | —C(CH₃)₂—C₇H₁₅ |
| H | —C(CH₃)(C₇H₁₅)(CH₃—CH—CH₃) |
| H | —CH(CH₃)—C₂H₅ |
| H | —CH₂—CH(CH₃)₂ |
| H | —CH(CH₃)—C₃H₇ |
| H | —C₆H₁₃ |
| H | —C₈H₁₇ |
| H | —CH(CH₃)—C₆H₁₃ |
| H | —CH(C₂H₅)—C₂H₅ |
| H | —CH(C₂H₅)—C₃H₇ |
| H | —CH(CH₃)—CH(CH₃)—CH₃ |
| H | —CH(C₂H₅)—C₄H₉ |
| H | —CH(CH₃)—C(CH₃)₂—CH₃ |
| H | —C₁₀H₂₁ |
| H | —CH(CH₃)—C₇H₁₅ |
| H | —CH(CH₃)—C₅H₁₁ |
| H | —CH₂—CH=CH₂ |
| H | —CH₂—C(CH₃)=CH₂ |
| H | —⟨cyclopropyl-H⟩ |
| H | —⟨cyclopentyl-H⟩ |
| H | —⟨cyclohexyl-H⟩ |
| H | —⟨cycloheptyl-H⟩ |
| H | —⟨cyclohexyl with CH₃, H⟩ |
| H | —(CH₂)₃—O—C₂H₅ |
| H | —(CH₂)₃—O—CH₃ |
| H | —(CH₂)₂—O—C₃H₇ |
| H | —(CH₂)₂—O—(CH₂)₂—O—C₄H₉ |
| H | —C(CH₃)₂—CH₂—O—C₆H₅ |
| H | —CH(CH₃)—CH₂—O—C₆H₅ |
| H | —(CH₂)₂—O—C₆H₅ |
| H | —CH(CH₃)—CH₂—O—C₆H₄—OC₂H₅ |
| H | —(CH₂)₂—O—C₆H₄—CH₃ |
| H | —CH(C₂H₅)—CH₂—OH |
| H | —CH(CH₃)—CH(OH)—CH₃ |
| H | —CH(CH₃)—CH(OH)—C₆H₅ |
| H | —C(CH₃)₂—CH(OH)—C₆H₅ |
| H | —C(CH₂OH)₂—C₂H₅ |
| H | —CH(CH₃)—(CH₂)₂—C₆H₅ |
| H | —CH(CH₃)—CH₂—C₆H₅ |
| H | —CH(C₂H₅)—CH₂—C₆H₅ |
| H | —CH₂—C₆H₅ |
| H | —(CH₂)₂—C₆H₅ |
| H | —CH₂—C₆H₄—OCH₃ |
| H | —(CH₂)₂—C₆H₃(OCH₃)(OCH₃) |
| H | —CH(CH₃)—CH(CH₃)—CH₂—C₆H₄—Cl |
| H | —CH(CH₃)—CH₂—C₆H₄—OH |
| H | —CH(CH₃)—CH₂—C₆H₄—OCH₃ |
| H | —(CH₂)₃—C₆H₄—CH₃ |
| H | —CH(CH₃)—(CH₂)₂—C₆H₃(OCH₃)(OCH₃) |
| H | —CH(CH₃)—(CH₂)₂—C₆H₄(CH₃)(CH₃) |
| H | —CH(CH₃)—(CH₂)₂—C₆H₄—OCH₃ |
| H | —C(CH₃)₂—CH₂—Cl |
| H | —(CH₂)₃—N(CH₃)₂ |
| H | —(CH₂)₂—N(C₂H₅)₂ |
| H | —CH(CH₃)—(CH₂)₂—N(CH₃)₂ |
| H | —(CH₂)₃—N⟨morpholino H O⟩ |

| R⁵ | R⁶ |
|---|---|
| H | —N(CH₃)(pyrrolidine with H) |
| H | —(CH₂)₃—S—CH₃ |
| H | —CH(CH₃)—CH₂—CO₂C₂H₅ |
| H | —CH₂—(tetrahydrofuran with H) |
| —CH(CH₃)₂ | —CH(CH₃)₂ |
| —CH₃ | —CH(CH₃)₂ |
| —CH(CH₃)₂ | —CH₂—C₆H₅ |
| —C₂H₅ | —C₂H₅ |
| —C₄H₉ | —C₄H₉ |
| —CH₃ | —CH₃ |
| —C₂H₅ | —C₄H₉ |
| —C₂H₅ | —(CH₂)₂—O—⟨C₆H₄⟩—Cl |
| —CH₂—C₆H₅ | —CH(CH₃)—C≡CH |
| —CH₂—C₆H₅ | —CH(CH₃)₂ |
| —OCCH₃ | —CH(CH₃)₂ |
|  | (CH₂)₅ |
|  | (CH₂)₂—O—(CH₂)₂ |
|  | (CH₂)₄ |
|  | CH₂—CH=CH—(CH₂)₂ |
|  | CH=CH—(CH₂)₃ |
|  | CH₂—CH=CH—CH=CH |
|  | (CH₂)₂—S—(CH₂)₂ |
| H | —C(CH₃)₃ |
| H | —CH(CH₃)₂ |
| H | —CH(CH₃)—CH₂—N(morpholine) |
| H | —(pyridinyl-N-piperidine) |
| H | —(piperidinyl with H on morpholine) |
| H | —CH(CH₃)—CH(C₆H₅)—N(morpholine) |
| H | —C(C₃H₇)₂—CH₂—N(morpholine) |
| H | —CH₂CH₂—N(piperazine NH) |
| H | —(piperidinyl H - piperidinyl H) |
| H | —CH₂CH₂—N(piperidine H) |
| H | —CH(C₃H₇)—N(piperidine H) |
| H | —CH₂CH₂—N(piperidine H) |
| H | —(phenyl-N-pyrrolidine H) |
| H | —C(CH₃)₂—CH₂—N(CH₃)₂ |
| H | —CH₂CH₂—N(C₂H₅)₂ |
| H | —CH₂CH₂—N(morpholine) |

Preparation of the novel products of this invention from the 5 - (3 - amino - 2 - hydroxypropoxy) - 2,1,3-benzothiadiazole is described in the following examples.

EXAMPLE 8

5-(3-isopropylamino-2-hydroxypropoxy)-2,1,3-benzothiadiazole

The acid chloride, 5-(chlorocarbonylmethoxy)-2,1,3-benzothiadiazole, from Example 3, Step A, is treated with potassium cyanide by the usual method to give the cyanoketone, 5 - cyanocarbonylmethoxy - 2,1,3 - benzothiadiazole. This product then is hydrogenated in the presence of a catalyst such as palladium on charcoal or reduced with lithium aluminum hydride to give 5-(3-amino-2-hydroxypropoxy)-2,1,3-benzothiadiazole. This amine, when reductively alkylated with acetone affords 5-(3-isopropylamino-2-hydroxypropoxy)-2,1,3-benzothiadiazole.

By replacing the cyanoketone and the acetone and the acetone reactants employed in Example 8 by the products identified in the following table, other 5-{3-[(CHYZ)NH] - 2 - hydroxypropoxy} - 2,1,3 - benzothiadiazole compounds are obtained wherein the groupings X, Y and Z are those given in Table II.

TABLE II benzothiadiazole-X + O=C(Y)(Z) → benzothiadiazole-O—CH₂—CH(OH)—CH₂NH(CHYZ)

| X | Y | Z |
|---|---|---|
| —O—CH₂—C(=O)—CHN₂ | —CH₂—C≡CH | CH₃ |
| —O—CH₂—C(=O)—CN₃ | —CH₃ | CH₃ |
| —O—CH₂—C(=O)—CH=NOH | —CH₂CH₂OH | CH₃ |
| —O—CH₂—C(=O)—CH₂NO₂ | —C₆H₁₁ | CH₃ |
| —O—CH₂—CH(OH)—CH₂NO₂ | —C₆H₅ | CH₃ |
| —O—CH₂—CH(OH)—CN | —C₂H₅ | C₂H₅ |
| —O—CH₂—C(=O)—CN | (CH₂)₅ | |

The invention further provides pharmaceutical compositions comprising, as active ingredient, at least one of the compounds according to the invention in association with a pharmaceutical carrier or excipient. The compounds may be presented in a form suitable for oral, rectal or parenteral administration. Thus, for example, compositions for oral administration may be solid or liquid and may take the form of capsules, tablets, coated tablets, suspensions, etc., such compositions comprising carriers or excipients conveniently used in the pharmaceutical art. Thus suitable tabletting excipients include lactose, potato and maise starches, talc, gelatine, stearic acid, magnesium stearate, polyvinyl pyrrolidone, or other known tabletting substances.

For parenteral administration, the carrier or excipient may be a sterile, parenterally acceptable liquid, e.g., pyrogen-free water or an aqueous solution of polyvinyl pyrrolidone, or a parenterally acceptable oil, e.g., arachis oil, contained in ampoules.

In compositions for rectal administration, the carrier may comprise a suppository base, e.g., cocoa butter or a glyceride.

Advantageously, the compositions may be formulated as dosage units, each unit being adapted to supply a fixed dose of active ingredient. Tablets, coated tablets, capsules, ampoules and suppositories are examples of preferred dosage unit forms according to the invention. Each dosage unit adapted for oral administration may conveniently contain 1 to 20 mg., and preferably 2 to 10 mg., of the active ingredient; each dosage unit adapted for parenteral administration may conveniently contain 0.1 to 5 mg., and preferably 0.1 to 1 mg., of the active ingredient.

In the following examples, pharmaceutical compositions according to the invention are illustrated; other acid addition salts, or other active compounds can be substituted for that named, if so desired.

The pharmaceutical compositions of the following examples contain 5-[3-(1,1 - dimethyl - 2 - hydroxyethylamino) - 2 - hydroxypropoxy] - 2,1,3 - benzothiadiazole hydrochloride as active ingredient.

EXAMPLE 9

An injectable solution is prepared by conventional methods containing:

Active compound—1 mg.
Sodium chloride—9 mg.
Bidist. water q.s.—1.0 ml.

EXAMPLE 10

Capsules are prepared by conventional methods containing:

Active compound—5 mg.
Magnesium stearate—2.0 mg.
Lactose U.S.P.—19.3 mg.

What is claimed is:
1. A 2,1,3-benzothiadiazole having the structure

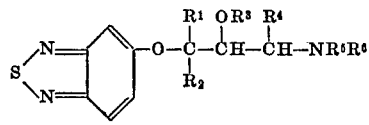

and pharmacologically acceptable salts thereof wherein $R^1$ is selected from the group consisting of hydrogen and lower alkyl; $R^2$ is selected from the group consisting of hydrogen and lower alkyl; $R^3$ is selected from the group consisting of hydrogen, benzoyl, and lower alkanoyl; $R^4$ is selected from the group consisting of hydrogen and lower alkyl; $R^5$ is selected from the group consisting of hydrogen, lower alkyl, phenyl-lower-alkyl, and lower alkanoyl; $R^6$ is selected from the group consisting of (1) straight or branched chain lower alkyl, (2) straight or branched chain lower alkyl substituted by one or two groups selected from (a) hydroxy, (b) carboxy, (c) lower alkoxycarbonyl, (d) lower alkoxy, (e) lower alkylthio, (f) di-lower alkylamino, (g) pyrrolidinyl, (h) phenyl, (i) phenyl substituted with from one to three similar or dissimilar groups selected from lower alkyl, lower alkoxy, halogen and hydroxy, (j) phenoxy, (k) phenoxy substituted with from one to three similar or dissimilar groups selected from lower alkyl, lower alkoxy, halogen and hydroxy, (3) straight or branched chain lower alkenyl, (4) straight or branched chain lower alkinyl, and (5) when $R^5$ and $R^6$ represent lower alkyl they can be joined through oxygen to form morpholino.

2. A 2,1,3-benzothiadiazole having the structure

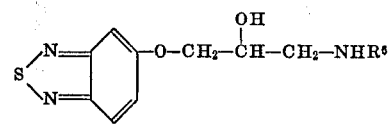

wherein $R^6$ has the meaning assigned to it in claim 1.

3. A 2,1,3-benzthiadiazole having the structure

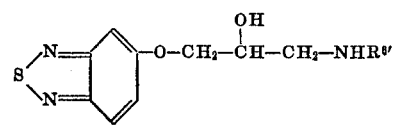

wherein $R^{6'}$ is selected from the group consisting of branched chain lower alkyl, hydroxy-branched chain lower alkyl, lower-alkoxy-branched chain lower alkyl and branched chain lower alkinyl.

4. A product as claimed in claim 3 wherein $R^{6'}$ is 1,1-dimethyl-2-hydroxyethyl.

5. 5-(3 - N - morpholino - 2 - hydroxypropoxy) - 2,1,3-benzothiadiazole.

References Cited

UNITED STATES PATENTS 3,501,285    3/1970    Baldwin _____ 260—304

ALEX MAZEL, Primary Examiner

R. J. GALLAGHER, Assistant Examiner

U.S. Cl. X.R.

260—218 BC, 213.4 E, 214.8 C, 243 R, 256.5 R, 304;
424—200, 232, 246, 248, 251, 263, 267, 270